United States Patent [19]
Braune

[11] 3,865,393
[45] Feb. 11, 1975

[54] ROAD ADJUSTED WHEELBARROW CHASSIS

[76] Inventor: Rudi Helmut Braune, Griffin Mill, Thrupp, Stroud, Gloucestershire, Great Britain GL5 2AZ

[22] Filed: May 3, 1973

[21] Appl. No.: 356,999

[52] U.S. Cl. .......................................... 280/47.26
[51] Int. Cl. ............................................ B62b 1/04
[58] Field of Search ............... 298/18, 17.6, 17.7, 2, 298/3; 280/47.24–47.25, 47.26, 47.31, 47.17, 104, 111; 180/27

[56] References Cited
UNITED STATES PATENTS

| | | |
|---|---|---|
| 3,052,480 | 9/1962 | Sanstrom .................... 280/104 X |
| 3,292,943 | 12/1966 | Crockett ..................... 280/111 X |
| 3,698,502 | 10/1972 | Patin ............................. 180/27 |

*Primary Examiner*—Stanley H. Tollberg
*Assistant Examiner*—Norman L. Stack, Jr.
*Attorney, Agent, or Firm*—Brisebois & Kruger

[57] ABSTRACT

A wheelbarrow having a pair of road wheels on a common axis transverse to the chassis and a pair of load bearing and guiding handlebars rigidly coupled together and rotatable about a fixed axis extending longitudinally of the barrow and normal to the wheel axis. A restoring spring and limiting stops are provided to restrict the angle of rotation of the handlebars. Means are provided in combination with the handlebars for tipping a container to discharge the load.

6 Claims, 5 Drawing Figures

PATENTED FEB 11 1975　3,865,393

ROAD ADJUSTED WHEELBARROW CHASSIS

This invention relates to wheelbarrows, hereinafter referred to as barrows, and in particular to barrows with two wheels. The normal two-wheeled barrow can be used for carrying heavier loads than the single wheeled barrow because it provides two-wheel stability and a greater part of the load is taken by the axles. The operator only requires to lift a small portion of the load and provide propulsion by pushing or pulling.

Although the above mentioned are advantages over the single-wheeled barrow there is one serious disadvantage. This is that the two-wheeled barrow is not as manoeuverable because having gained positive sideways stability it cannot easily tilt sideways to negotiate a corner.

It is the main object of this invention to overcome this low manoeuverability by providing tilting handles. The handles are positioned and constructed in such a way as to provide a means of facilitating steering the barrow by tilting the handles through movement only of the arms of the operator. Further objects are to provide stabilizing spring means and stops to limit the tilting of the handles and to aid steering.

More particularly the invention consists in a wheelbarrow having a chassis on which a pair of road wheels are mounted for rotation about a common axis transverse to the chassis, and a pair of load-bearing and guiding handlebars rigidly connected together and capable of rotation with respect to said chassis in a bearing mounting rigid with said chassis and having an axis directed substantially horizontal, longitudinally of the barrow and normal to the wheel axis.

When the operator is wheeling the barrow in a straight line, a slight tilting movement of the handles by the arms only facilitates a precise steering movement on the barrow.

A simple locking device may be provided to lock the handles, if required. Conveniently a central "third point" ground support is provided to keep handles always upright if the barrow is not in use or while set down by the operator while reseting or filling or emptying. Such support may be rigidly fixed to the chassis or may be fixed to the handles.

The barrow body itself may be provided with a tilting device of known type having a tilting axis at right angles to the handlebar axis, i.e., parallel to the wheel axis, to enable a container to be rocked in order to tip the load, e.g., forwardly, when required, and various body styles may be provided to allow interchange of load carrying means of different types such as a bin, platform, or box.

A practical embodiment of the invention will now be described in more detail with reference to the accompanying diagrammatic drawings wherein.

Figure 1:
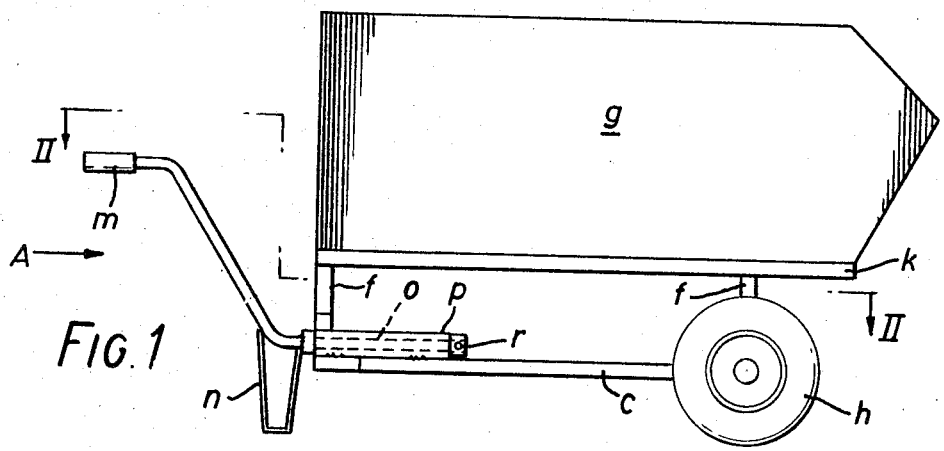
FIG. 1 is a side elevation of a wheelbarrow.

Referring now to the drawings, the chassis comprises a rigid frame of generally triangular shape in plan and comprising the horizontal members $a$, $b$, $c$, having a horizontal cross bar $d$ welded thereto at the apex and a horizontal bar $e$ at the base, to the ends of which horizontal bars there are secured uprights $f$ supporting a horizontal frame or platform $k$, which, conveniently, is also of welded construction, and upon which is carried a removable bin $g$, or other container, according to the purpose for which the barrow is to be used. A pair of wheels $h$ are independently rotatable on a common axis parallel to and substantially coaxial with the chassis frame member $e$.

At the rear of the wheelbarrow a pair of handles $m$ are welded to a central ground strut $n$ and having a common forward integral extension $o$ of round cross section rotatable in a fixed tube $p$, which is welded to the central longeron member $b$ of the chassis. Longitudinal movement of the extension in the bearing is prevented by a cotter pin $r$ passing transversely through the extension $o$, where it projects from the tube $p$, or by any other equivalent device.

When in use, the handles $m$ are lifted by the operator in the usual manner to take part of the load the remainder of which is taken by the road wheels $h$, and in normal straight line travel the ends of the handles remain substantially at the same level as each other. When it is required to steer to the left, the operator rotates the handles anti-clockwise as seen in the direction of the arrow A in the drawing, i.e., the left hand handle is turned downwards and the right hand handle is correspondingly raised, the position of the handle-bars facilitating steering the barrow to the left.

This action may be considered as follows. Consider the total load taken by the barrow and comprising the contents of the bin and the weight of the chassis acting at a centre of gravity Z on the horizontal longitudinal axis XY of the barrow. In normal straight line travel the effort applied by the operator acts centrally along the line XY contained in the vertical plane of symmetry of the chassis. If, however, the handles are rotated precise steering control is made possible. For example, by anti-clockwise rotation the effort applied by the operator no longer acts along the line XY, but can easily have its line of action offset to one side, and may be considered as acting obliquely, for example along the line $X_1$, $Y_1$. This resultant force, which, for convenience, has been assumed to pass through the centre of gravity Z, will have a moment tending to rotate the right hand wheel about the point of contact of the left hand wheel with the ground, causing the right hand wheel to rotate at a faster rate than the left hand wheel and resulting in steering to the left. Correspondingly rotation of the handles in the clockwise direction as seen in the direction of the arrow A will facilitate steering to the right.

Various modifications may be adopted whilst retaining the principle of the invention above explained. For example means may be provided for temporarily locking the handles in the normal position symmetrical about a vertical plane through X–Y shown in FIG. 2, and such locking device may consist of a further cotter pin (not shown) having a clearance fit in aligned bores in the tubular bearing $p$ and the handle extension $o$, such pin being readily removable to restore the steering function when required.

Additional means may be provided for stabilizing the barrow and assisting steering. These may comprise stops for limiting the tilt of the handles and at the same time facilitating and improving steering control, and functioning preferably under the control of a return spring.

Figure 3:
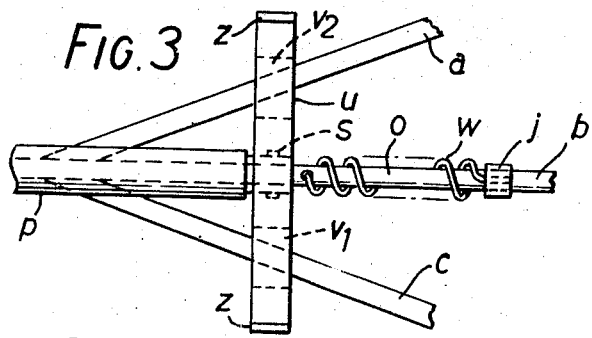
FIGS. 3 to 5 are details on an enlarged scale showing stops for limiting the tilting of the handles, and a torsion return spring.
Figure 4:
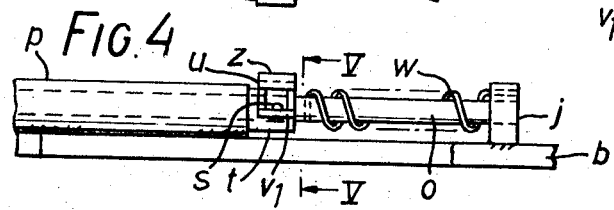
Figure 5:
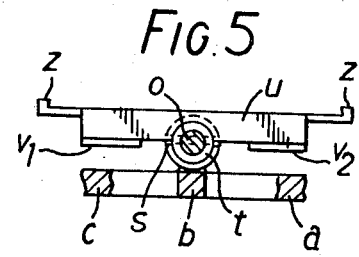

Such means are shown, for example, in the modification of FIGS. 3 to 5, where FIG. 3 is a detail in plan, FIG. 4 is an elevation and FIG. 5 is a section on V—V of FIG. 4.

Figure 2:
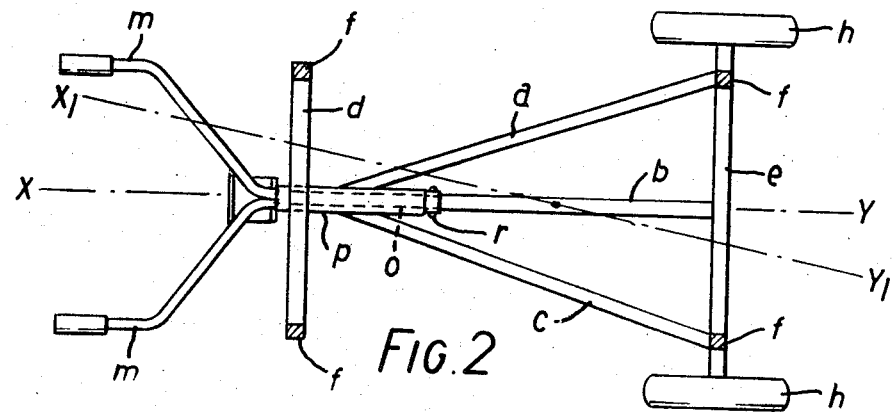
FIG. 2 is a plan view partly in section along the line II—II of FIG. 1.

For resiliently returning the handles to the normal position of FIG. 2 a torsion spring $w$ has one end anchored to the handle extension $o$, extending from the bearing tube $p$, and the other end rotatable in a bearing boss $j$ fixed on the chassis, for example as here shown, on the central member $b$. Such a torsion spring will be under substantially no stress when the handles are in the normal position, but if the handles are rotated either clockwise or anti-clockwise a stress will be placed upon the torsion spring, which will tend to return the handles to the normal position. The torsion spring here shown is only one example of a torsion device. A torsion bar may be adapted to a similar function. Furthermore, steering control is improved by a limiting stop device. This consists of a transverse crosshead $u$ of channel section bar stock welded to the top of a bush $t$ pinned at $s$ to the extension rod $o$ where it emerges from the end of the fixed tubular bearing member $p$. The crosshead, which turns together with the part $o$, has shock absorbing pads $v_1$ and $v_2$ arranged to engage with a respective one of a pair of fixed stops, which, in the present case, are the chassis frame members $a$ and $c$. These pads are so positioned and dimensioned that the rotation of the handles is limited to an angle of, say, 15 to 20 from the normal, but the action of the crosshead $u$ in engaging the chassis frame stops will tend to lift one or the other side of the chassis about the horizontal axis X–Y, and thus assist steering. Consider, for example, the anti-clockwise tilting of the handlebars in FIG. 2, already described above, the rod $o$ will rotate against the resistance of the torsion spring until pad $v_1$ engages with frame member $a$, when the moment of one half $u$ about the fulcrum point $v_1$, acting through a lever arm transverse to $o$, will tend to reduce the road pressure of the rigid hand road wheel $h$ as compared with that of the left hand road wheel. Steering to the left is thus facilitated.

The platform may be adapted to carry a variety of different sizes and shapes of bin according to the purpose required to be fulfilled.

A modified construction of chassis may be provided in which end frames are provided fore and aft of the platform to prevent displacement of a bin, or any movable object or objects carried on the platform, when the barrow is in motion. Such a construction is suitable for railway platform trucks. Such end frames may be demountably secured to the platform by bolts and wing nuts.

The chassis may also be so designed that the platform, instead of being rigidly fixed thereto, as shown in FIG. 1, or designed to tilt about the forward edge for unloading, may be constructed to allow a tilting motion of the bin about trunnions on a longitudinal axis substantially parallel to the handlebar axis so as to discharge to one side or the other the contents of the bin or other container. In general this will be possible when the chassis is constructed with end frames carrying trunnion bearings in a horizontal tilting axis approximately through or slightly below the centre of gravity of the loaded bin. When travelling, the bin, or other container, will be stabilised to prevent sideways tipping during travel, by means of a locking device, of known type, which can then be released or tripped at the setting down point in order to enable the contents of the container to be discharged to one side or the other of the horizontal longitudinal axis. For the purpose of discharging the contents, suitable handles may be provided at one or both sides of the container. Furthermore, the tilting handlebars $m$ may be adapted to cause upsetting of the bin or other container for dumping the contents when the vehicle is stationary. For this purpose the crosshead $u$ may be extended as shown to carry strikers $z$, which, when the handlebars are swung, will strike the bin or container at a suitable point at one side or the other according to the required dumping position for the load.

What I claim is:

1. A wheelbarrow having a chassis on which a pair of road wheels are mounted for independent rotation about a common axis transverse to the chassis, bearing means rigidly mounted in said chassis and defining a substantially horizontal axis of rotation in a vertical plane of symmetry of said chassis, and a pair of load-bearing and guiding handlebars rigidly connected together and capable of swivelling motion in common about said axis with respect to said chassis so that the left and right handlebars can assume oppositely asymmetrical positions with respect to the chassis when steering to the one and the other side of straight line travel.

2. A wheelbarrow according to claim 1, wherein a locking device is provided to prevent rotation of the handlebars relative to the chassis.

3. A wheelbarrow according to claim 1, wherein stops are provided to limit the angle of rotation in both directions from the normal position of the handlebars, in which they are symmetrical with respect to a vertical plane through the rotation axis, and to apply a part of the steering effort as a moment transverse to the handlebar axis tending to unbalance the road wheel pressures and thus aid steering to the left or to the right.

4. A wheelbarrow according to claim 1, wherein a return spring is provided tending to restore the handlebars to a normal rest position in which the handlebar ends are in a common horizontal plane.

5. A wheelbarrow according to claim 1, wherein the bearing mounting is secured to a central longeron of the chassis.

6. A wheelbarrow according to claim 5, wherein the bearing mounting consists of a tube within which a linear extension member common to both handlebars is rotatably mounted.

* * * * *